United States Patent
Han et al.

(10) Patent No.: US 9,425,453 B2
(45) Date of Patent: Aug. 23, 2016

(54) BATTERY MODULE

(71) Applicant: SAMSUNG SDI CO., LTD., Yongin-si, Gyeonggi-do (KR)

(72) Inventors: Minyeol Han, Yongin-si (KR); Haekwon Yoon, Yongin-si (KR); Sangwon Byun, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 169 days.

(21) Appl. No.: 14/272,908

(22) Filed: May 8, 2014

(65) Prior Publication Data

US 2015/0111072 A1     Apr. 23, 2015

(30) Foreign Application Priority Data

Oct. 21, 2013   (KR) .................. 10-2013-0125380

(51) Int. Cl.
*H01M 2/34* (2006.01)
*H01M 2/20* (2006.01)
*H01M 10/0525* (2010.01)

(52) U.S. Cl.
CPC ............. *H01M 2/34* (2013.01); *H01M 2/206* (2013.01); *H01M 2/348* (2013.01); *H01M 2/345* (2013.01); *H01M 10/0525* (2013.01); *H01M 2200/103* (2013.01); *H01M 2200/20* (2013.01)

(58) Field of Classification Search
CPC ...... H01M 2/34; H01M 2/206; H01M 2/345; H01M 2/348
See application file for complete search history.

(56) References Cited

U.S. PATENT DOCUMENTS

| | | | |
|---|---|---|---|
| 2010/0216008 A1 | 8/2010 | Yoon | |
| 2010/0266879 A1 | 10/2010 | Byun et al. | |
| 2013/0004831 A1* | 1/2013 | Byun | H01M 2/26 429/179 |
| 2013/0252038 A1* | 9/2013 | Kim | H01M 2/1077 429/61 |
| 2014/0139185 A1* | 5/2014 | Han | H02J 7/0029 320/118 |

FOREIGN PATENT DOCUMENTS

| | | |
|---|---|---|
| EP | 2-541-649 A1 | 1/2013 |
| EP | 2-672-548 A1 | 12/2013 |
| EP | 2-733-770 A1 | 5/2014 |
| EP | 2-768-069 A1 | 8/2014 |
| KR | 2010-0097402 A | 9/2010 |
| KR | 10-1030916 B | 10/2010 |
| KR | 2013-0071821 A | 7/2013 |
| WO | WO 2012/157855 A1 | 11/2012 |

OTHER PUBLICATIONS

Search Report dated Jan. 27, 2015 in corresponding European Patent Application No. 14171828.8.

* cited by examiner

*Primary Examiner* — Stewart Fraser
(74) *Attorney, Agent, or Firm* — Lee & Morse, P.C.

(57) ABSTRACT

A battery module including a plurality of battery cells arranged in a row; a plurality of bus bars connecting the plurality of battery cells in series; and a short circuit member that is mechanically connected to a first battery cell among the plurality of battery cells and that is electrically connected to a second battery cell among the plurality of battery cells.

14 Claims, 13 Drawing Sheets

BATTERY MODULE

CROSS-REFERENCE TO RELATED APPLICATION

Korean Patent Application No. 10-2013-0125380, filed on Oct. 21, 2013, in the Korean Intellectual Property Office, and entitled: "BATTERY MODULE," is incorporated by reference herein in its entirety.

BACKGROUND

1. Field

Embodiments relate to a battery module.

2. Description of the Related Art

A lithium ion secondary battery may be used in a small-sized electronic device, such as a notebook computer or a smart phone. Recently developed lithium ion secondary batteries may have advantageous characteristics, including high output power, high capacity, and lightness in weight, as compared to other types of secondary batteries, and they may be widely used in hybrid vehicles or electric vehicles.

SUMMARY

Embodiments are directed to a battery module.

The embodiments may be realized by providing a battery module including a plurality of battery cells arranged in a row; a plurality of bus bars connecting the plurality of battery cells in series; and a short circuit member that is mechanically connected to a first battery cell among the plurality of battery cells and that is electrically connected to a second battery cell among the plurality of battery cells.

The first battery cell may be positioned at one end of the row among the plurality of battery cells arranged in the row, and the second battery cell may be positioned at another end of the row among the plurality of battery cells arranged in the row.

The first battery cell may further include a membrane that is electrically short-circuitable to the short circuit member, in response to an overcharge of the battery module.

The membrane may be invertable in response to an increase in an internal pressure of the first battery cell to then be electrically short circuited to the short circuit member, in response to the overcharge of the battery module.

The short circuit member may include a base region that is mechanically connected to the first battery cell; a first extension region that extends from the base region and overlies the membrane of the first battery cell; and a second extension region that extends from the base region and that is electrically connected to the second battery cell.

The battery module may further include an insulation layer between the first battery cell and the base region.

Each of the first and second battery cells may include an electrode assembly, a case accommodating the electrode assembly, and a first terminal and a second terminal passing through the case and extending from the electrode assembly, and the second extension region of the short circuit member may be electrically connected to the second terminal of the second battery cell.

The battery module may further include an insulation layer between the second extension region of the short circuit member and the first battery cell and between the second extension region of the short circuit member and the second battery cell except for the second terminal.

The case of the first battery cell and the first terminal of the first battery cell may be electrically connected to each other, and the membrane of the first battery cell may be in the case of the first battery cell.

Each of the first and second battery cells may further include a fuse formed between the electrode assembly and the first terminal.

The fuse may be meltable and cutable, in response to the overcharge of the battery module.

In response to a conductor puncturing the short circuit member and the case of the first battery cell the case of the first battery cell and the short circuit member may be short-circuited to each other by the conductor, a current may flow in the fuse in an amount larger than a current that melts the fuse, and an electrical connection between the case and the electrode assembly may be cut off to eliminate a polarity of the case.

Each of the first and second battery cells may include an electrode assembly, a case accommodating the electrode assembly, and a first terminal and a second terminal passing through the case and outwardly extending from the electrode assembly, the case may include a long sidewall and a short sidewall, the short sidewall having smaller area than an area of the long sidewall, and the base region of the short circuit member may be on the long sidewall.

The area of the long sidewall may be about equal to an area of the base region.

The membrane may be substantially parallel with the first terminal and the second terminal.

The membrane may be closer to the second terminal of the first battery cell than to the first terminal of the first battery cell.

BRIEF DESCRIPTION OF THE DRAWINGS

Features will be apparent to those of skill in the art by describing in detail exemplary embodiments with reference to the attached drawings in which.

DETAILED DESCRIPTION

Figure 1A:
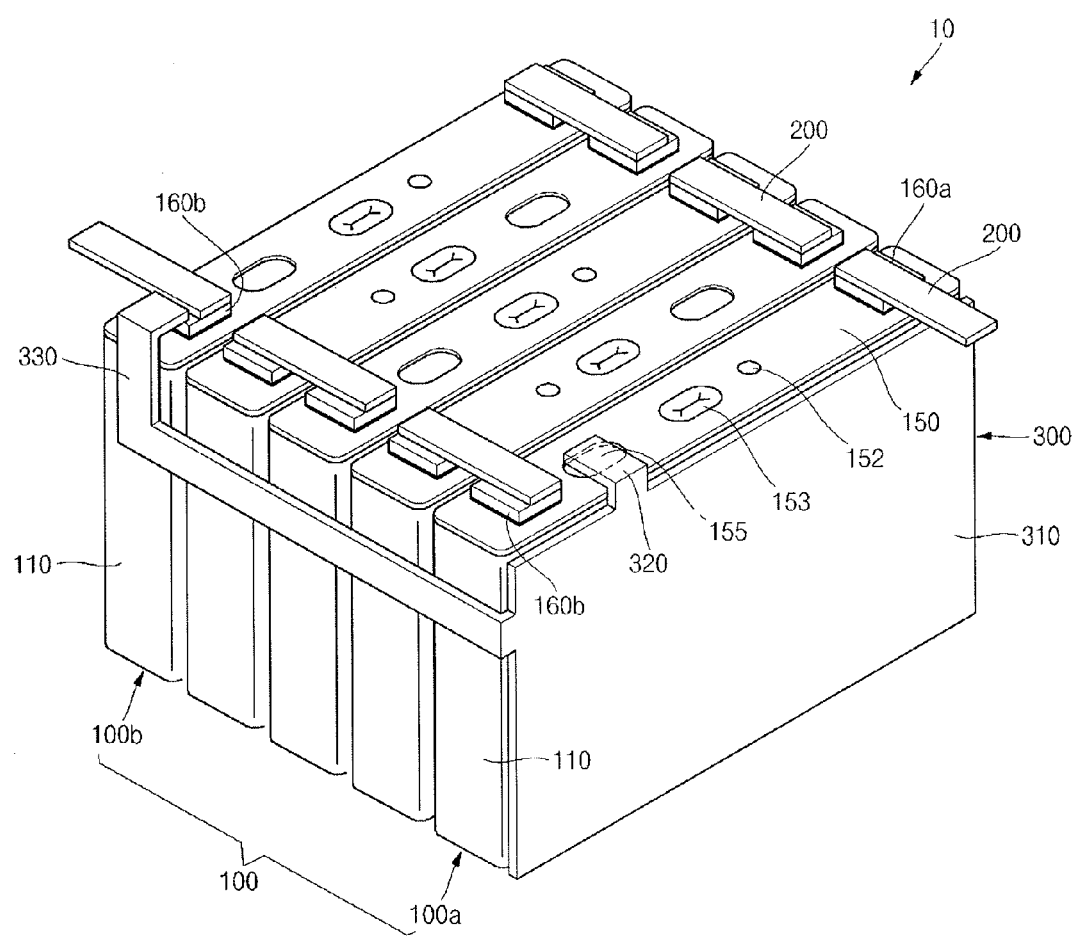
FIGS. 1A and 1B illustrate a perspective view and a partially exploded perspective view of a battery module according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or parts, these members, elements, regions, layers and/or parts should not be limited by these terms. These terms are only used to distinguish one member, element, region, layer and/or part from another member, element, region, layer and/or part. Thus, for example, a first member, element, region, layer, and/or part discussed below could be termed a second member, element, region, layer, and/or part without departing from the teachings of the present application.

In addition, as used herein, the term "short circuit member" may mean an element for improving both overcharge safety and puncture safety of a battery module. Further, as used herein, the term "short circuit member" may not mean that it is installed in each battery cell, but rather may mean that one short circuit member is installed at an exterior side of a battery module having a plurality of battery cells arranged in a row.

Figure 1B:
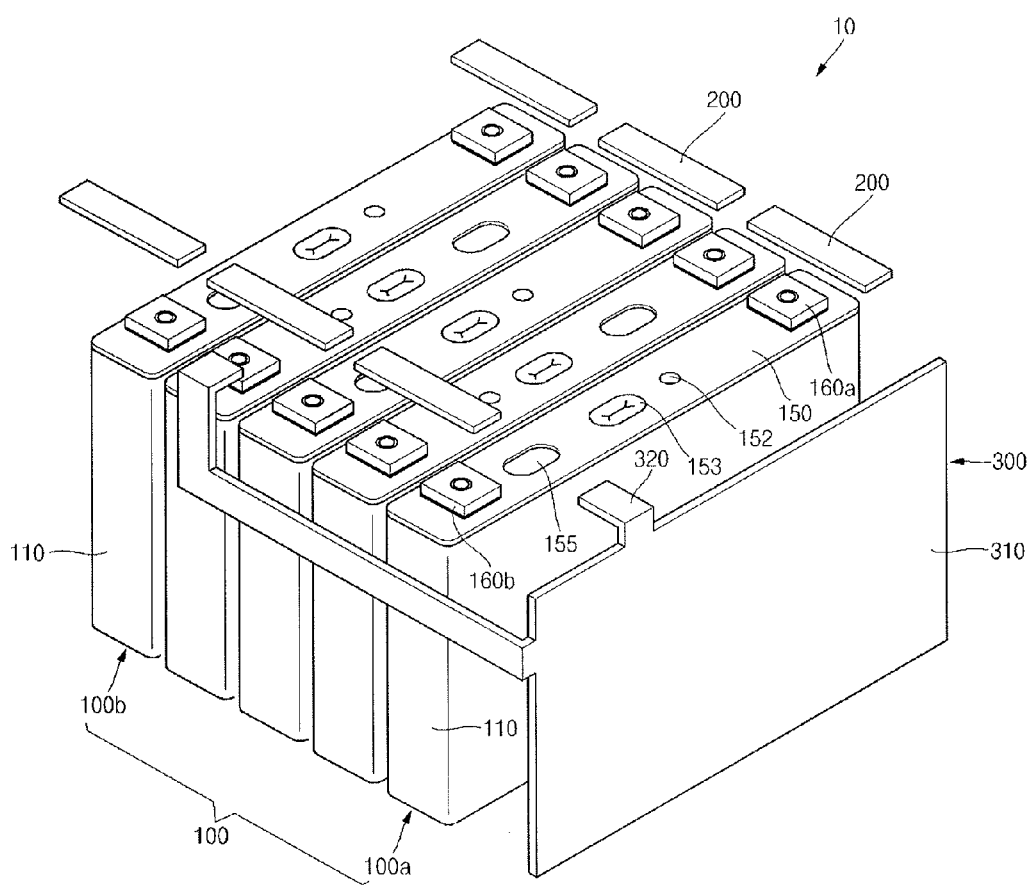

FIGS. 1A and 1B illustrate a perspective view and a partially exploded perspective view of a battery module (10) according to an embodiment.

As illustrated in FIGS. 1A and 1B, the battery module 10 according to an embodiment may include a plurality of battery cells 100, a plurality of bus bars 200, and a short circuit member 300.

The plurality of battery cells 100 may be, e.g., horizontally, arranged in a row. In the following description, a first battery cell 100a may be a battery cell positioned first (e.g., at one end of the row) among the plurality of battery cells 100 arranged in the row, and a second battery cell 100b may be a battery cell positioned last (e.g., at another or opposite end of the row) among the plurality of battery cells 100 arranged in the row. For example, a plurality of other battery cells may or may not be positioned between the first battery cell and the second battery cell.

Each of the plurality of battery cells 100 may include, e.g., a case 110, a cap plate 150 (covering the case 110), and a first terminal (e.g., a positive electrode terminal) 160a and a second terminal (e.g., a negative electrode terminal) 160b protruding upwardly through the cap plate 150. In an implementation, the cap plate 150 may be a portion of the case 110, and the case 110 and the cap plate 150 may provide the battery cell 100 with a generally prismatic shape.

In an implementation, the first terminal 160a may be electrically connected to the cap plate 150, and the case 110 and the cap plate 150 may have the same polarity (e.g., a positive polarity) as the first terminal 160a. In an implementation, the cap plate 150 may further include a membrane 155 that faces or protrudes downwardly or inwardly in a normal state of operation of the battery cell and may be inverted (to face or protrude upwardly or outwardly) in an overcharged state due to an increase in an internal pressure of the battery cell.

The membrane 155 may be formed on the same plane with the first terminal 160a and the second terminal 160b. For example, outer edges of the membrane 155 may be parallel with a surface of the first terminal 160a or the second terminal 160b. In an implementation, the membrane 155 may be closer to the second terminal 160b of one of the battery cells than to the first terminal 160a of the one battery cell. In an implementation, the membrane 155 may be formed in another suitable location on the battery cell.

The cap plate 150 may further include a vent 153 (for releasing internal gas to the outside during overcharge), and a plug 152 (for closing an electrolyte injection hole through which an electrolytic solution is injected in the manufacturing process). A configuration of each of the battery cells 100 will be described below in more detail.

The plurality of bus bars 200 may electrically connect the plurality of battery cells 100 in series. For example, the plurality of bus bars 200 may electrically connect the first terminal 160a (or the second terminal 160b) at one side of one of the battery cells 100 to the second terminal 160b (or the first terminal 160a) of a side of another of the battery cells 100 that is adjacent to the one battery cell 100. In an implementation, the plurality of bus bars 200 may electrically connect the plurality of battery cells 100 in parallel.

The short circuit member 300 may be mechanically or physically connected or attached to the first battery cell 100a. The short circuit member 300 may be electrically connected to the second battery cell 100b. For example, when the battery module 10 is in a normal state of operation (e.g., when the battery module 10 is not overcharged and/or is otherwise functioning normally), the short circuit member 300 may be only mechanically connected to the first battery cell 100a, without being electrically connected thereto and may be electrically connected to only the second battery cell 100b. In an implementation, an insulation layer may be interposed between the first battery cell 100a and the short circuit member 300.

In an implementation, the short circuit member 300 may be a conductor made of, e.g., copper, a copper alloy, aluminum, an aluminum alloy, iron, an iron alloy, stainless steel, or the like.

The short circuit member 300 may include, e.g., a base region 310, a first extension region 320, and a second extension region 330.

The base region 310 may be mechanically or physically connected to an outside or exterior of the first battery cell 100a by, e.g., an adhesive layer. For example, as described above, the first battery cell 100a may have the case 110, which includes a long sidewall (having a relatively large area) and a short sidewall connected to the long sidewall (and having a relatively small area, e.g., an area smaller than the area of the long sidewall). The base region 310 of the short circuit member 300 may be attached to an outside of the long sidewall through or with an insulation layer therebetween. In an implementation, an area of the base region 310 may be about equal to or slightly smaller than the area of the long sidewall. In an implementation, the area of the base region 310 may be larger than the area of the long sidewall.

The first extension region 320 may extend upwardly by a predetermined length from the base region 310 and may be positioned at a region corresponding to or overlying the membrane 155 of the first battery cell 100a. For example, the first extension region 320 may be bent at least once, and an end of the first extension region 320 may be positioned on or overlying the membrane 155. For example, the membrane 155 and the first extension region 320 may not be short circuited to each other in a normal state of operation of the battery module 10, and may be short circuited to each other in an overcharged state of the battery module 10. In an implementation, a width of the first extension region 320 may be smaller than a width of the base region 310.

The second extension region 330 may laterally extend from the base region 310 to be electrically connected to the second battery cell 100b. For example, the second extension region 330 may be bent at least once, and an end of the second extension region 330 may be electrically connected to the second terminal 160b of the second battery cell 100b. For example, the end of the second extension region 330 may be welded to the second terminal 160b of the second battery cell 100b. In an implementation, a width of the second extension region 330 may be smaller than the width of the base region 310. In an implementation, the second extension region 330 may be insulated from the cases 110 of each of the first and second battery cells 100a and 100b through or due to an insulation layer therebetween.

According to an embodiment, overcharge safety may be improved on a module basis. For example, one short circuit member 300 may not be installed within or corresponding to each of the battery cells 100, but rather may be installed at an exterior side of the battery module 10 to make an overcharge current of the battery module 10 bypassed through the short circuit member 300 in the event of an overcharge of the battery module 10.

For example, when the battery module 10 is overcharged, the membrane 155 (that may be been previously electrically connected to the first terminal 160a of the first battery cell) may be inverted to then also be electrically connected to the first extension region 320 of the short circuit member 300. Accordingly, the overcharge current may be bypassed to the outside of the battery module 10 through the first extension region 320, the base region 310, and the second extension region 330 of the short circuit member 300, thereby improving the overcharge safety of the battery module 10.

Figure 2A:
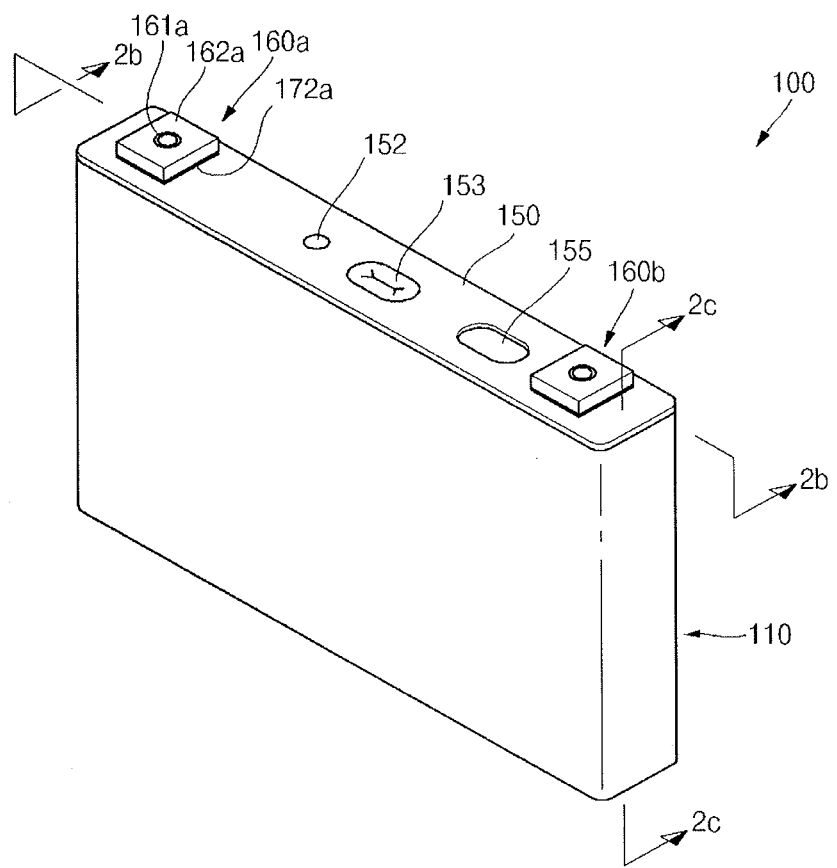
FIGS. 2A, 2B, and 2C illustrate a perspective view, a horizontal sectional view, and a vertical sectional view of an exemplary battery cell of a battery module according to an embodiment.
Figure 2B:
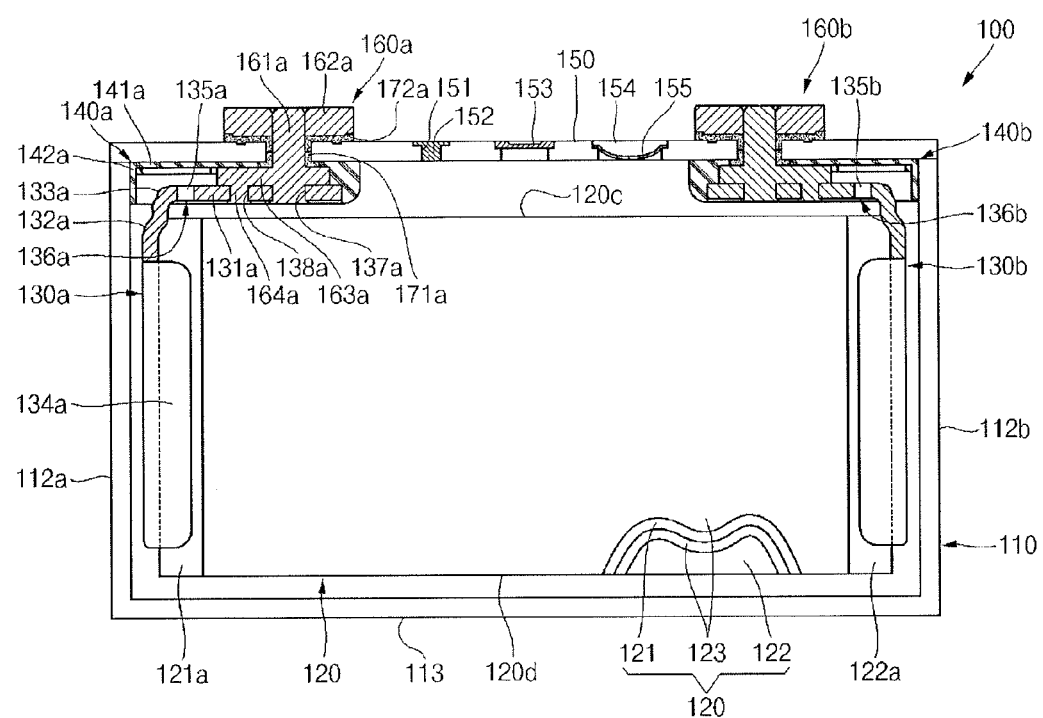
Figure 2C:
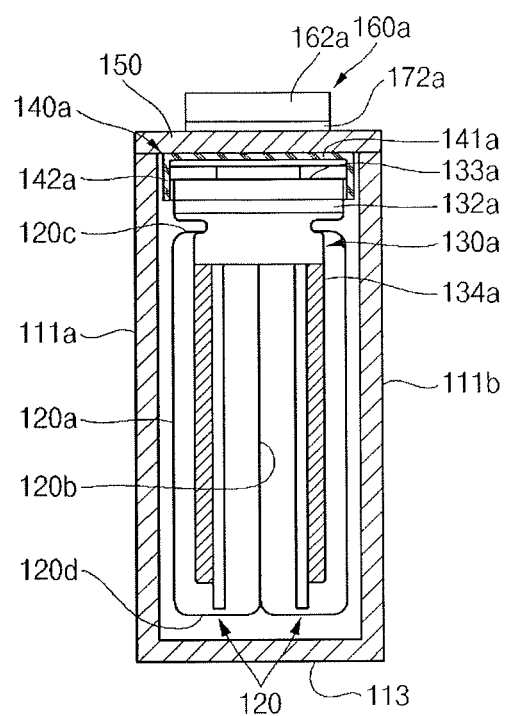
Figure 3A:
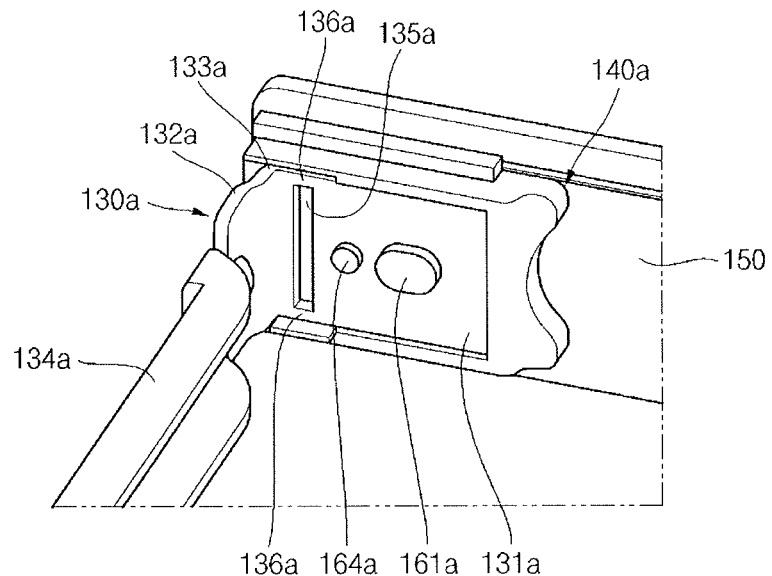
FIGS. 3A and 3B illustrate perspective views of exemplary fuses in a battery cell of a battery module according to an embodiment.
Figure 3B:
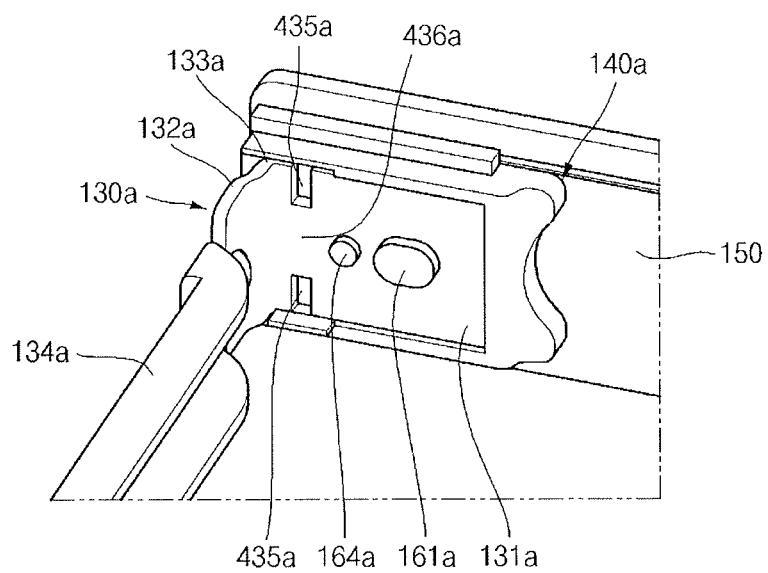

FIGS. 2A, 2B, and 2C illustrate a perspective view, a horizontal sectional view, and a vertical sectional view of an exemplary battery cell of a battery module according to an embodiment. FIGS. 3A and 3B illustrate perspective views of exemplary fuses formed in a battery cell of a battery module according to an embodiment.

As illustrated in FIGS. 2A to 2C, each of the battery cells 100 may include a case 110, an electrode assembly 120, a first collector plate 130a, a first insulation part 140a, a second collector plate 130b, a second insulation part 140b, a cap plate 150, a first terminal 160a, and a second terminal 160b.

Referring to FIG. 2C, a number of electrode assemblies 120 may be two, or a number of electrode assemblies 120 may be smaller than or greater than two. In addition, the case 110 may be referred to as a can. In an implementation, the case 110 may include the cap plate 150.

The case 110 may include a pair of long sidewalls 111a and 111b (which may be roughly planar and may face each other), a pair of short sidewalls 112a and 112b (which may connect the long sidewalls 111a and 111b and may face each other), and a bottom wall 113 connecting the long sidewalls 111a and 111b and the short sidewalls 112a and 112b. In an implementation, an area of each of the long sidewalls 111a and 111b may be larger than an area of each of the short sidewalls 112a and 112b. In an implementation, the case 110 may have a top open region sealed by the cap plate 150. The electrode assembly 120 may be accommodated in the case 110 with an electrolytic solution. In an implementation, the case 110 may be made of one of, e.g., aluminum, an aluminum alloy, copper, a copper alloy, iron, an iron alloy, stainless steel, or the like.

The electrode assembly 120 may include a pair of long side regions 120a and 120b (which may be roughly planar and may face each other), and a pair of short side regions 120c and 120d (which may connect the long side regions 120a and 120b and may face each other). In an implementation, an area of each of the long side regions 120a and 120b may be larger than an area of each of the short side regions 120c and 120d. In addition, the electrode assembly 120 may include a first non-coating region (i.e., a first uncoated portion) 121a that is not coated with a first active material (not shown) and a second non-coating region (i.e., a second uncoated portion) 122a that is not coated with a second active material (not shown) extending a predetermined length in opposite directions. For example, the first non-coating region 121a may extend and protrude a predetermined length in one direction through the long side regions 120a and 120b and the short side regions 120c and 120d, and the second non-coating region 122a may extend and protrude a predetermined length in another direction (opposite to the one direction) through the long side regions 120a and 120b and the short side regions 120c and 120d. In an implementation, the first and second non-coating regions 121a and 122a of the electrode assembly 120 may extend a predetermined length toward the short sidewalls 112a and 112b of the case 110.

In addition, the electrode assembly 120 may be formed by winding or stacking a first electrode plate 121, a second electrode plate 122, and a separator 123 between the first and second electrode plates 121 and 122, which may have a thin plate or film shape. The first electrode plate 121 may function as a positive electrode, and the second electrode plate 122 may function as a negative electrode. Alternatively, the first electrode plate 121, and the second electrode plate 122 may function oppositely.

The first electrode plate 121 may be formed by applying a first electrode active material (e.g., a transition metal oxide) to a first electrode current collector formed of metal foil (e.g., aluminum or an aluminum alloy). The first electrode plate 121 may include a first non-coating portion 121a to which the first electrode active metal is not applied. The first electrode non-coating portion 121a may function as a current flow passage between the first electrode plate 121 and a first collector plate 130a.

The second electrode plate 122 may be formed by applying a second electrode active material (e.g., graphite or carbon) to a second electrode current collector formed of metal foil (e.g., aluminum or copper foil or alloys thereof). The second electrode plate 122 may include a second electrode non-coating portion 122a to which the second electrode active metal is not applied. The second electrode non-coating portion 122a may function as a current flow passage between the second electrode plate 122 and a second collector plate 130b. The first and second electrode plates 121 and 122 may have different polarities with respect to one another.

The separator 123 may be between the first electrode plate 121 and the second electrode plate 122 to help prevent a short circuit and to facilitate movement of charges (such as lithium ions). The separator 123 may be formed of, e.g., a polyethylene film, a polypropylene film, a composite film including polyethylene and polypropylene, or the like.

As described above, the electrode assembly 120 is accommodated in the case 110 together with an electrolytic solution. The electrolytic solution may include an organic solvent, e.g., ethylene carbonate (EC), propylene carbonate (PC), diethyl carbonate (DEC), ethyl methyl carbonate (EMC), dimethyl carbonate (DMC), and a lithium salt, e.g., $LiPF_6$, or $LiBF_4$. In an implementation, the electrolytic solution may be in a liquid, solid, or gel phase.

The first collector plate 130a may be positioned inside the case 110 and may be electrically connected between the first terminal 160a and the electrode assembly 120. For example, the first collector plate 130a may include a first region 131a electrically connected to the first terminal 160a, a second region 132a bent from the first region 131a and electrically connected to the first non-coating region 121a of the electrode assembly 120, and a bent region 133a formed between the first region 131a and the second region 132a. Further, the second region 132a may include a third region 134a welded to the first non-coating region 121a. With this configuration, the electrode assembly 120 may be constructed such that it substantially clings to the first collector plate 130a. For example, the electrode assembly 120 may be pulled down from the first collector plate 130a because of gravity, and a bottom region of the electrode assembly 120 may be spaced a predetermined distance apart from the bottom wall 113 of the case 110.

In an implementation, a substantially rectangular fuse hole 135a may be formed in the first region 131a of the first collector plate 130a, and a pair of fuses 136a (each having a relatively small sectional area) may be formed at opposite sides of the fuse hole 135a. For example, a width of each of the fuses 136a may be smaller than a width of the first region 131a or the second region 132a. In order to form the fuses 136a, a through hole formed in the first region 131a is illustrated in FIG. 3A. As shown in FIG. 3B, cut-out portions 435a may be formed at opposite sides of the fuse 436a.

The fuse 136a may be melted (e.g., may be meltable) by heat generated due to an over-current flowing in an event of an external short circuit or an overcharge of the battery cell 100 to cut off a charge and/or discharge current, thereby improving the safety of the battery cell 100.

In addition, coupling holes 137a and 138a (to which a fastening region 161a of the first terminal 160a and a coupling protrusion 164a may be coupled) may be formed in the first region 131a of the first collector plate 130a.

In an implementation, the first collector plate 130a may include, e.g., aluminum, an aluminum alloy, titanium, stainless steel, gold, tantalum, niobium, hafnium, zirconium, vanadium, indium, cobalt, tungsten, tin, beryllium, molybdenum, or alloys thereof. In an implementation, when the first collector plate 130a is made of aluminum, the fuse 136a may also be made of aluminum. A melting point of aluminum is approximately 659° C. Thus, if the temperature of the fuse 136a rises to approximately 659° C. due to overcharge, the fuse 136a may be naturally melted and cut (e.g., may be cutable). The longer the time taken for the fuse 136a to be melted and cut, the longer an arc discharge time may be, and thus the battery cell 100 may be internally unstable.

The first insulation part 140a may roughly surround the first region 131a of the first collector plate 130a. For example, the first insulation part 140a may be positioned between the cap plate 150 and the first region 131a of the first collector plate 130a and may surround the fastening region 161a of the first terminal 160a, a flange 163a, and the first region 131a of the first collector plate 130a. For example, the first insulation part 140a may include an upper region 141a interposed between the first region 131a of the first collector plate 130a and the flange 163a of the first terminal 160 and the cap plate 150, and approximately four side regions 142a surrounding the first region 131a of the first collector plate 130a, the fastening region 161a of the first terminal 160a and the flange 163a. The first insulation part 140a may be formed of, e.g., polyphenylene sulfide (which may be stable or non-reactive with the electrolytic solution) or the like.

The cap plate 150 may cover an open region of the case 110 while allowing the first terminal 160a to be exposed or protruded to the outside. A boundary between the case 110 and the cap plate 150 may be welded using laser beams. In an implementation, an electrolytic solution injection hole 161 may be formed in the cap plate 150 and may be closed by a plug 16. In an implementation, a vent 163 (having a relatively small thickness) may also be formed in the cap plate 150. The cap plate 150 may be made of the same material as the case 110.

In an implementation, the cap plate 150 may include a through hole 154 and a membrane 155 closing or covering the through hole 154. The through hole 154 and the membrane 155 may be formed between the second terminal 160b and the vent 153. In an implementation, the through hole 154 and the membrane 155 may be formed at other suitable locations. The membrane 155 may have a thickness that is smaller than that of the cap plate 150, and may be convexly formed or may protrude or point toward the electrode assembly 120 in a normal state (e.g., in a state in which the battery cell is not overcharged or is otherwise operating normally). The membrane 155 may be convexly formed by being inverted in a direction away from the electrode assembly 120 (e.g., may convexly protrude or point away from the electrode assembly) in response to to an increase in an internal pressure of the battery cell in an abnormal state (e.g., in a state in which the battery cell is overcharged). The membrane 155 may electrically short circuit to the first extension region 310 of the short circuit member 300, e.g., the membrane 155 may be short circuitable to the first extension region 310 of the short circuit member 300.

The first terminal 160a may be electrically connected to the first collector plate 130a and may pass through the cap plate 150 to then outwardly extend a predetermined length. For example, the first terminal 160a may be coupled to the first region 131a of the first collector plate 130a and may pass through the first insulation part 140a and the cap plate 150 to then outwardly extend a predetermined length. The first terminal 160a may be electrically and mechanically coupled to the coupling hole 137a in the first region 131a of the first collector plate 130a and may include the pillar-shaped fastening region 161a, and a fixing region 162a fixed to the fastening region 161a and outside the case 110 or the cap plate 150 and coupled with a bus bar (not shown).

In an implementation, a plate-shaped flange 163a may horizontally extend a predetermined length and inside the case 110 or the cap plate 150 of the fastening region 161a. The flange 163a may include the downwardly extending coupling protrusion 164a (coupled to another coupling hole 138a in the first region 131a of the first collector plate 130a).

In an implementation, a top surface of the flange 163a may be brought into close contact with the upper region 141a of the first insulation part 140a. In an implementation, a predetermined space may be provided between the flange 163a and the side region 142a of the first insulation part 140a. The fuses 136a and the bent region 133a of the first collector plate 130a may be positioned in the space.

In an implementation, the fastening region 161a, the fixing region 162a, the flange 163a, and the coupling protrusion 164a (constituting the first terminal 160a) may include, e.g., aluminum, an aluminum alloy, or the like.

In an implementation, the fastening region 161a above the cap plate 150 may be coupled to the fixing region 162a to then be riveted or welded, and the fastening region 161a and the coupling protrusion 164a below the cap plate 150 may be coupled to the coupling holes 137a and 138a in the first region 131a of the first collector plate 130a to then be riveted or welded.

In an implementation, the fastening region 161a of the first terminal 160a may pass through the cap plate 150, and a seal gasket 171a may be formed on its outer circumference. Therefore, the first terminal 160a may be insulated from the cap plate 150. In an implementation, the seal gasket 171a may be formed of, e.g., perfluoroalkoxy (which may be inert or non-reactive with the electrolytic solution).

In an implementation, an upper insulation part 172a may be interposed between the fixing region 162a and the case 110. The upper insulation part 172a may be brought into close contact with the seal gasket 171a. The upper insulation part 172a may insulate the first fixing region 162a and the cap plate 150 from each other. In an implementation, the upper insulation part 172a may be formed of, e.g., polyphenylene sulfide (which may be inert or non-reactive with the electrolytic solution).

For example, in a battery in which the case 110 and the cap plate 150 are positively charged, the fixing region 162a and the cap plate 150 may be electrically connected to each other through a high resistance member (not shown).

Configurations of the second collector plate 130b, the second insulation part 140b, and the second terminal 160b may be basically the same as those of the first collector plate 130a, the first insulation part 140a, and the first terminal 160a, respectively. In an implementation, a fuse hole 135b and a fuse 136b may be provided in the second collector plate 130b. In an implementation, the fuse hole 135b and the fuse 136b may not be provided in the second collector plate 130b. For example, the second collector plate 130b may be made of copper or a copper alloy. Copper has a melting point of approximately 1,083° C., which is higher than that of aluminum. For example, before the fuse 136b of the second collector plate 130b starts to operate (e.g., melt), the fuse 136a of the first collector plate 130a operates first, so that a charge current and/or a discharge current is cut off. In order to further improve the safety of the battery cell 100, as shown in FIG. 2B, the fuse hole 135b and the fuse 136b of the second collector plate 130b may be provided.

Figure 4A:
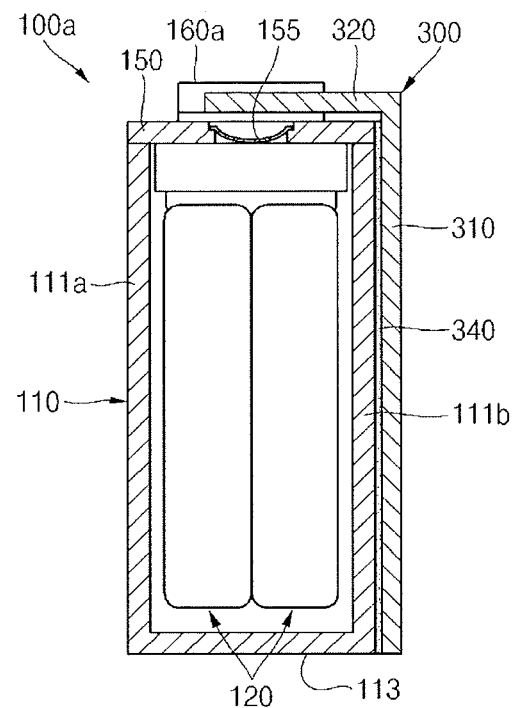
FIG. 4A illustrates a horizontal sectional view showing a relationship between a battery cell and a short circuit member in a battery module according to an embodiment.
Figure 4B:
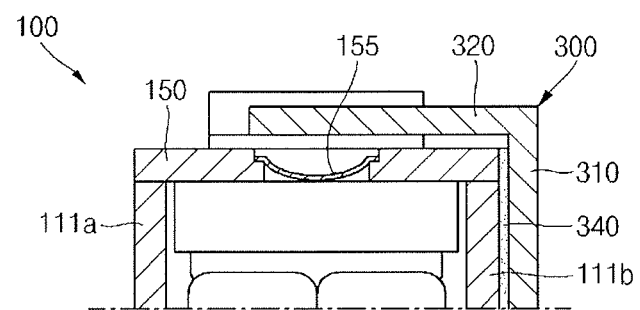
FIGS. 4B and 4C illustrate enlarged sectional views showing a relationship between a membrane and a short circuit member before and after a short circuit occurs when a battery module is overcharged.

FIG. 4A illustrates a horizontal sectional view showing a relationship between a battery cell (100) and a short circuit member (300) in a battery module (10) according to an embodiment. FIGS. 4B and 4B illustrate partial enlarged sectional views showing a relationship between a membrane (155) and a short circuit member (300) before and after a short circuit occurs when a battery module (10) is overcharged.

As illustrated in FIG. 4A, an insulation layer 340 may be provided in or on a base region 310 of the short circuit member 300 to be connected or attached to the long sidewall 111b of the case 110. For example, the base region 310 may be attached to the outside, not the inside, of the case 110. In an implementation, a first extension region 320 of the short circuit member 300 may upwardly extend from the base region 310 by a predetermined length to then be bent in a direction parallel with the cap plate 150. For example, the first extension region 320 of the short circuit member 300 may be positioned on or overlying the membrane 155 (that is formed on or in the cap plate 150). The second extension region 330 of the short circuit member 300 may be electrically connected to the second terminal (i.e., a negative electrode terminal) 160b of the battery cell 100. The second extension region 330 of the short circuit member 300 may be insulated from the case 110 of the battery cell 100 through the insulation layer 340.

Figure 4C:
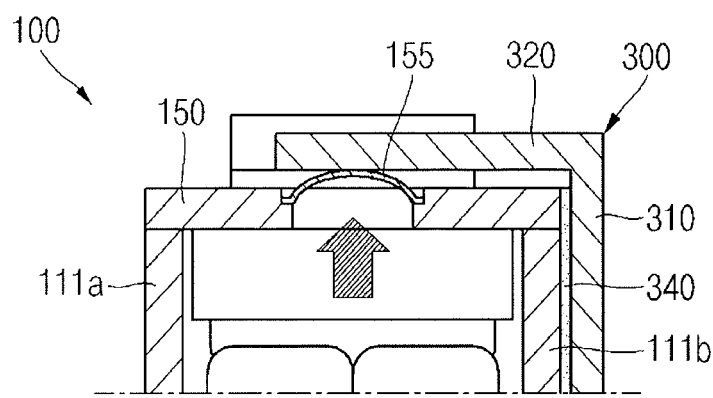

As illustrated in FIG. 4B, the first extension region 320 of the short circuit member 300 may not be short circuited to the membrane 155 in a normal state (e.g., when the battery cell 100 is not overcharged and/or is otherwise functioning normally). However, as illustrated in FIG. 4C, the first extension region 320 of the short circuit member 300 may be short circuited to the membrane 155 in an abnormal state (e.g., when the battery cell 100 is overcharged). For example, the membrane 155 may be short circuitable if the battery cell 100 is overcharged, gases are generated from an electrolytic solution or an active material, and the internal pressure of the battery cell 100 increases. Accordingly, the previously downwardly or inwardly convex membrane 155 may be inverted to be upwardly or outwardly convex, so that the membrane 155 (and the terminal of the first battery cell electrically connected thereto) is short circuited to the first extension region 320 of the short circuit member 300 (and the terminal of the second battery electrically connected thereto).

Figure 5A:
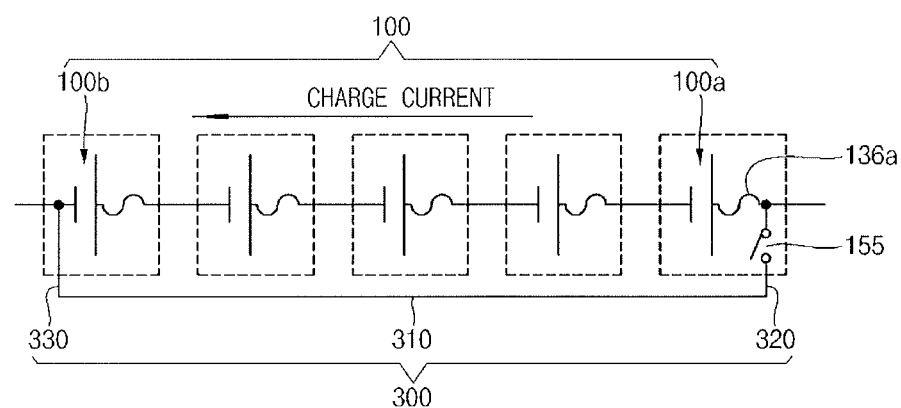
FIGS. 5A to 5C illustrate circuit views showing an operation of a battery module according to an embodiment when the battery module is overcharged.
Figure 5B:
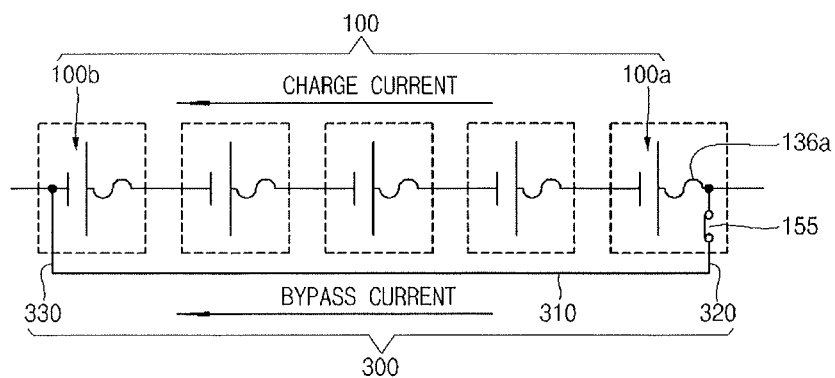
Figure 5C:
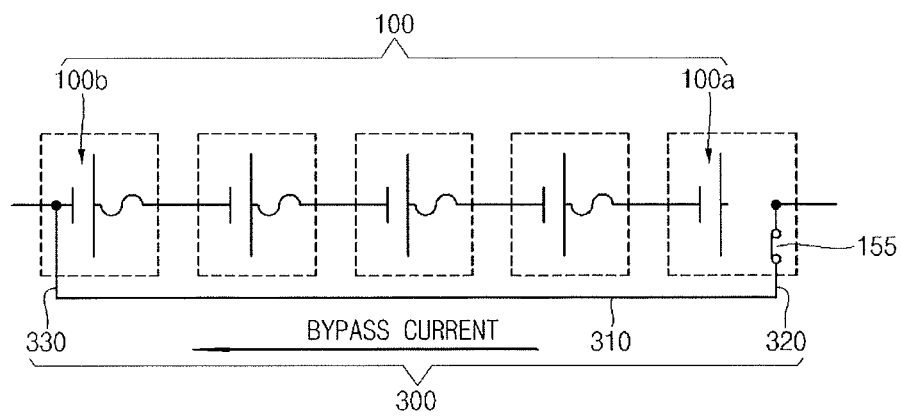

FIGS. 5A to 5C illustrate circuit views showing an operation of a battery module (10) according to an embodiment when the battery module is overcharged.

As illustrated in FIG. 5A, the battery module 10 may include five battery cells 100 connected to each other in series, and each may include a fuse 136a and a short circuit member 300 (having a switch 155 between the first battery cell 100a and the second battery cell 100b). For example, the switch 155 may substantially correspond to the membrane 155. In an implementation, when the battery module 10 is overcharged, an overcharge current may flow from the first battery cell 100a to the second battery cell 100b.

As illustrated in FIG. 5B, if the battery module 10 is overcharged, the membrane 155 of the first battery cell 100a may operate to be short circuited to the short circuit member 300. In a circuit view, the switch 155 is turned on. For example, if the battery module 10 is overcharged, the internal pressure of the battery cell 100 may increase, so that the membrane 155 may be pushed outwardly and inverted to be short circuited to the short circuit member 300.

As illustrated in FIG. 5C, if the battery module 10 is overcharged, the fuse 136a of the first battery cell 100a may be melted and cut for the first time, so that a charge current may not be supplied to the battery cells 100, but rather is bypassed through the switch, i.e., the membrane 155, and the short circuit member 300. For example, the fuse 136a of the first battery cell 100a may be melted and cut for the first time because the charge current may be supplied to the first battery cell 100a for the first time. In an implementation, the state shown in FIGS. 5B and 5C may be established almost at the same time.

As described above, according to an embodiment, when the battery module 10 is overcharged, a charge current may not be supplied to the battery cells 100, but rather may be bypassed through the short circuit member 300, thereby improving overcharge safety of the battery module 10.

Figure 6:
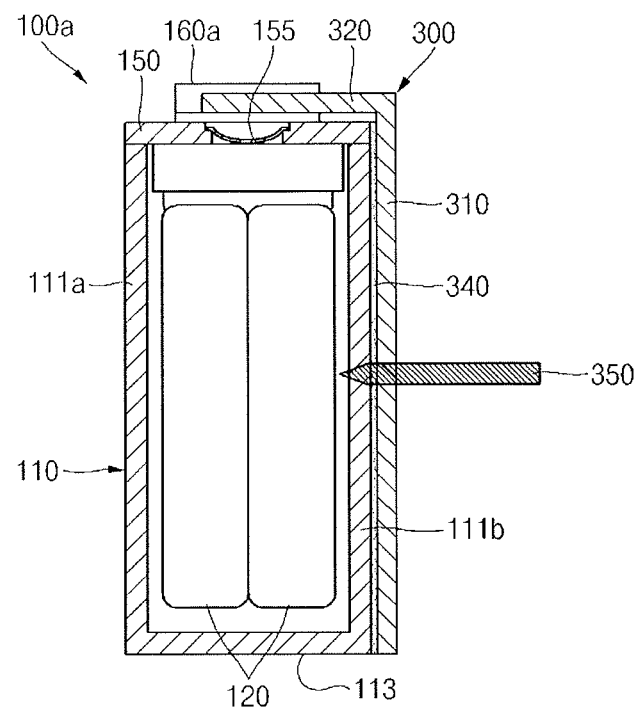
FIG. 6 illustrates a horizontal sectional view of a state in which a battery module according to an embodiment is punctured by a conductor.

FIG. 6 illustrates a horizontal sectional view showing a state in which a battery module (10) according to an embodiment is punctured by a conductor (350).

As illustrated in FIG. 6, a, e.g., needle-shaped, conductor 350 may puncture the short circuit member 300 and the first battery cell 100a. Accordingly, the short circuit member 300 and the case 110 of the first battery cell 100a may be directly short circuited to each other by the, e.g., needle-shaped, conductor 350.

Figure 7A:
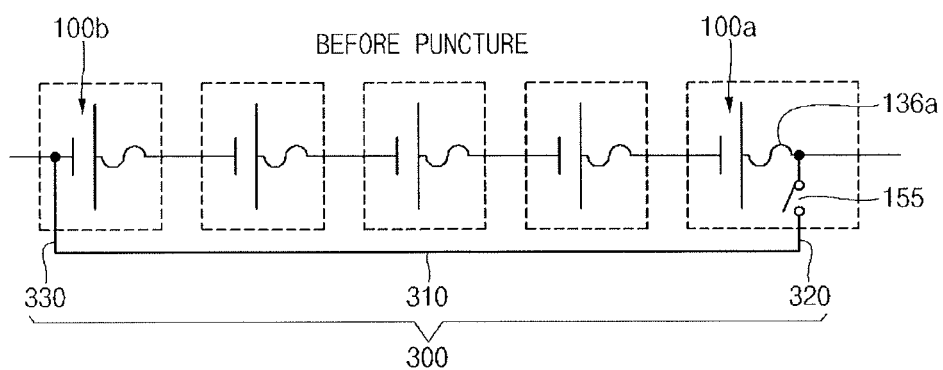
FIGS. 7A and 7B illustrate circuit views showing an operation of a battery module according to an embodiment when the battery module is punctured.
Figure 7B:
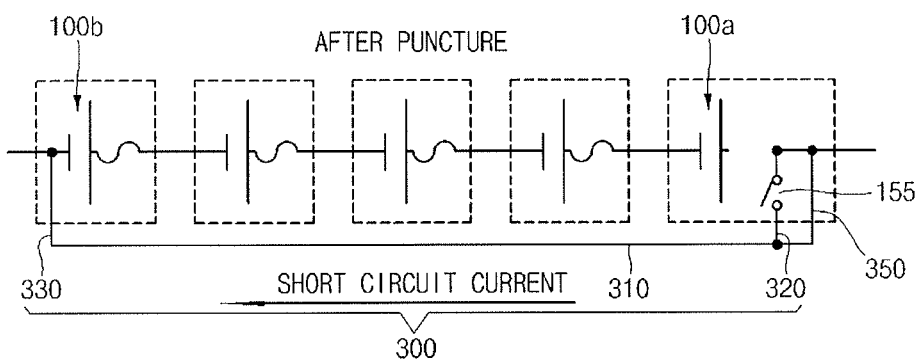

FIGS. 7A and 7B illustrate circuit views showing an operation of a battery module (10) according to an embodiment when the battery module is punctured.

As illustrated in FIGS. 7A and 7B, if the, e.g., needle-shaped, conductor 350 causes the short circuit member 300 and the case 110 of the first battery cell 100a to be directly short circuited to each other, a bypass short circuit current passage may be formed between the first battery cell 100a and the second battery cell 100b.

For example, an overcurrent may flow between the first battery cell 100a and the second battery cell 100b in a larger amount than an allowable current, thereby melting the fuse 136a of the first battery cell 100a. Therefore, as soon as the, e.g., needle-shaped, conductor 350 punctures the first battery cell 100a, the bypass short circuit current passage may be formed between the first battery cell 100a and the second battery cell 100b, thereby improving puncture safety of the battery module 10.

Figure 8A:
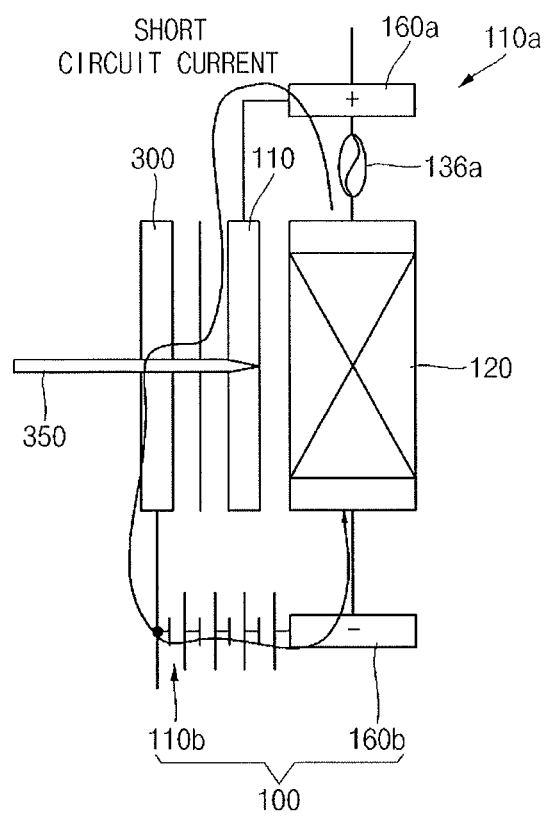
FIGS. 8A and 8B illustrate conceptual diagrams of an operation of a battery module according to an embodiment when the battery module is punctured.
Figure 8B:
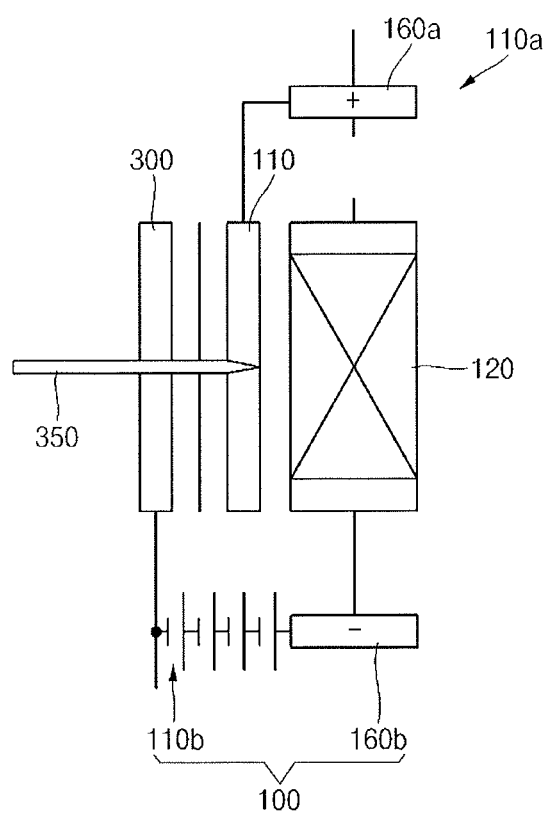

FIGS. 8A and 8B illustrate conceptual diagrams showing an operation of a battery module (10) according to an embodiment when the battery module is punctured.

As illustrated in FIGS. 8A and 8B, when the, e.g., needle-shaped, conductor 350 punctures the first battery cell 100a, a short circuit current may flow through the first terminal (i.e., the positive electrode terminal) 160a of the first battery cell 100a, the case 110 of the first battery cell 100a, the needle-shaped conductor 350, the short circuit member 300, the plurality of battery cells 100, and the second terminal (i.e., the negative electrode terminal) 160b of the first battery cell 100a. For example, the short circuit current may be higher than or equal to an allowable current, and the fuse 136a of the first battery cell 100a may be melted and cut. Therefore, the case 110 of the first battery cell 100a may be electrically separated from the positive electrode of the electrode assembly 120, so that the polarity of the case 110 of the first battery cell 100a may be eliminated.

As described above, when the, e.g., needle-shaped, conductor 350 punctures the short circuit member 300 and the first battery cell 100a, the energy of the first battery cell 100a may be rapidly reduced by the short circuit member 300. In addition, as the fuse 136a is melted and cut, the polarity of the case 110 of the first battery cell 100a, e.g., a positive polarity, may be eliminated. Accordingly, the puncture safety of the first battery cell 100a may be improved.

By way of summation and review, a lithium ion secondary battery used in a hybrid vehicle or an electric vehicle may have a relatively high capacity, and it may be important to provide a safety device against overcharge or puncture. The safety device may rapidly cut off a charge or discharge path when the lithium ion secondary battery is overcharged or punctured.

The embodiments may provide a battery module, which may help improve safety against overcharge and puncture on a module basis.

According to an embodiment, a short circuit member may be installed only at one side of the battery module, rather than being installed in each battery cell, so that overcharge current may be bypassed through the short circuit member during overcharge of the battery module, thereby improving overcharge safety of the battery module. In addition, only one short circuit member may be installed on each module, and a number of components may be reduced, thereby reducing the manufacturing cost of the battery module.

In addition, if a needle-shaped conductor were to puncture the short circuit member and the battery cell, the energy of the battery cell may be rapidly released by the short circuit member. Further, a polarity (e.g., a positive polarity) of a case of the battery cell may be eliminated by melting of a fuse, thereby improving puncture safety of the battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells arranged in a row;
a plurality of bus bars connecting the plurality of battery cells in series; and
a short circuit member that is mechanically connected to a first battery cell among the plurality of battery cells and that is electrically connected to a second battery cell among the plurality of battery cells,
wherein the first battery cell further includes a membrane that is electrically short-circuitable to the short circuit member, in response to an overcharge of the battery module,
wherein the short circuit member includes:
a planar base region that is mechanically connected to the first battery cell;
a planar first extension region that extends from the base region in a plane orthogonal to a plane of the base region and overlies the membrane of the first battery cell; and
a second extension region that extends from the base region and that is electrically connected to the second battery cell,
wherein each of the first and second battery cells includes an electrode assembly, a case accommodating the electrode assembly, and a first terminal and a second terminal passing through the case and extending from the electrode assembly, and
wherein the second extension region of the short circuit member is electrically connected to the second terminal of the second battery cell, the first battery cell further includes a membrane that is electrically short-circuitable to the short circuit member, in response to an overcharge of the battery module.

2. The battery module as claimed in claim 1, wherein:
the first battery cell is positioned at one end of the row among the plurality of battery cells arranged in the row, and
the second battery cell is positioned at another end of the row among the plurality of battery cells arranged in the row.

3. The battery module as claimed in claim 1, wherein the membrane is invertable in response to an increase in an internal pressure of the first battery cell to then be electrically short circuited to the short circuit member, in response to the overcharge of the battery module.

4. The battery module as claimed in claim 1, further comprising an insulation layer between the first battery cell and the base region.

5. The battery module as claimed in claim 1, further comprising an insulation layer between the second extension region of the short circuit member and the first battery cell and between the second extension region of the short circuit member and the second battery cell except for the second terminal.

6. The battery module as claimed in claim 1, wherein:
the case of the first battery cell and the first terminal of the first battery cell are electrically connected to each other, and
the membrane of the first battery cell is in the case of the first battery cell.

7. The battery module as claimed in claim 6, wherein each of the first and second battery cells further includes a fuse formed between the electrode assembly and the first terminal.

8. The battery module as claimed in claim 7, wherein, the fuse is meltable and cutable, in response to the overcharge of the battery module.

9. The battery module as claimed in claim 7, wherein, in response to a conductor puncturing the short circuit member and the case of the first battery cell:
the case of the first battery cell and the short circuit member are short-circuited to each other by the conductor,
a current flows in the fuse in an amount larger than a current that melts the fuse, and
an electrical connection between the case and the electrode assembly is cut off to eliminate a polarity of the case.

10. The battery module as claimed in claim 1, wherein:
each of the first and second battery cells includes an electrode assembly, a case accommodating the electrode assembly, and a first terminal and a second terminal passing through the case and outwardly extending from the electrode assembly,
the case includes a planar long sidewall and a planar short sidewall, the short sidewall having smaller area than an area of the long sidewall, and
the base region of the short circuit member is on the planar long sidewall.

11. The battery module as claimed in claim 10, wherein the area of the long sidewall is about equal to an area of the base region.

12. The battery module as claimed in claim 10, wherein the planar long sidewall is orthogonal to a side of the case through which the first terminal and second terminal pass.

13. The battery module as claimed in claim 1, wherein the membrane is substantially parallel with the first terminal and the second terminal.

14. The battery module as claimed in claim 1, wherein the membrane is closer to the second terminal of the first battery cell than to the first terminal of the first battery cell.

* * * * *